(12) United States Patent
Niamut et al.

(10) Patent No.: US 8,514,705 B2
(45) Date of Patent: Aug. 20, 2013

(54) METHOD AND SYSTEM FOR SYNCHRONIZING A GROUP OF END-TERMINALS

(75) Inventors: Omar Aziz Niamut, Vlaardingen (NL); Mattijs Oskar Van Deventer, Leidschendam (NL); Hans Maarten Stokking, The Hague (NL); Fabian Arthur Walraven, Groningen (NL)

(73) Assignees: Koninklijke KPN N.V., The Hague (NL); Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 511 days.

(21) Appl. No.: 12/739,297

(22) PCT Filed: Oct. 23, 2008

(86) PCT No.: PCT/EP2008/008979
§ 371 (c)(1),
(2), (4) Date: Apr. 22, 2010

(87) PCT Pub. No.: WO2009/053072
PCT Pub. Date: Apr. 30, 2009

(65) Prior Publication Data
US 2010/0303100 A1    Dec. 2, 2010

(30) Foreign Application Priority Data

Oct. 23, 2007   (EP) ..................................... 07020737
Sep. 12, 2008   (EP) ..................................... 08016107

(51) Int. Cl.
*H04J 3/14*       (2006.01)
(52) U.S. Cl.
USPC ....................................................... 370/231

(58) Field of Classification Search
USPC ................. 370/310–350, 229–253, 432–435, 370/464–469
See application file for complete search history.

(56) References Cited

U.S. PATENT DOCUMENTS 6,031,846 A * 2/2000 Gurusami et al. ............ 370/508
6,490,454 B1 * 12/2002 Kangas et al. .............. 455/456.1

(Continued)

FOREIGN PATENT DOCUMENTS

JP    2002-027534    1/2002
JP    2005-033499    2/2005

(Continued)

OTHER PUBLICATIONS

International Search Report and Written Opinion, PCT International Application No. PCT/EP2008/008979 dated Feb. 10, 2009.

(Continued)

*Primary Examiner* — Kwang B Yao
*Assistant Examiner* — Juvena Loo
(74) *Attorney, Agent, or Firm* — McDonnell Boehnen Hulbert & Berghoff LLP (57) ABSTRACT

A method is described for synchronizing the transmission of a stream to a group of end-terminals. The method is used in a system comprising a station transmitting a packetized stream over a network to at least a first and second network node. Each network node comprises a variable delay unit and each network node is connected to one or more end-terminals. In the method the synchronization unit receives arrival time information of a packet in the broadcast stream at the first and second network node. Delay information is calculated for the first and second network node on the basis of the arrival time information of the packet. Further, the delay information is transmitted to the first and second network node so that the variable delay unit in the first and second network node is able to transmit the broadcast stream to the first and second end-terminal in a substantially synchronized way.

19 Claims, 9 Drawing Sheets

(56) References Cited

U.S. PATENT DOCUMENTS

| | | | |
|---|---|---|---|
| 6,760,316 B1 | 7/2004 | Hebsgaard et al. | |
| 6,847,826 B1 * | 1/2005 | Wesby et al. | 455/502 |
| 7,680,063 B2 * | 3/2010 | Bedekar et al. | 370/252 |
| 7,693,130 B2 * | 4/2010 | Barry et al. | 370/350 |
| 7,711,008 B2 * | 5/2010 | Jones et al. | 370/503 |
| 8,116,268 B2 * | 2/2012 | Sun et al. | 370/329 |
| 2001/0038622 A1 * | 11/2001 | Kato | 370/350 |
| 2001/0046240 A1 * | 11/2001 | Longoni et al. | 370/503 |
| 2002/0131375 A1 * | 9/2002 | Vogel et al. | 370/322 |
| 2004/0244044 A1 | 12/2004 | Brommer | |
| 2005/0157658 A1 * | 7/2005 | Ishii et al. | 370/252 |
| 2006/0088023 A1 * | 4/2006 | Muller | 370/350 |
| 2007/0183353 A1 * | 8/2007 | Malladi | 370/312 |
| 2007/0189327 A1 | 8/2007 | Konda | |
| 2008/0227474 A1 * | 9/2008 | Dick et al. | 455/502 |
| 2008/0247331 A1 * | 10/2008 | Becker et al. | 370/253 |
| 2009/0034479 A1 | 2/2009 | Wakayama et al. | |

FOREIGN PATENT DOCUMENTS

| | | |
|---|---|---|
| WO | WO 2006/011777 A1 * | 2/2006 |
| WO | WO2006/121378 | 11/2006 |

OTHER PUBLICATIONS

Baldi, Mario et al., "A Scalable Solution for Engineering Streaming Traffic in the Future Internet", ScienceDirect, Computer Networks, vol. 51, No. 14, Jul. 31, 2007, pp. 4092-4111.

Nunome, Toshiro et al., "An Application-Level QoS Comparison of Inter-Destination Synchronization Schemes for Continuous Media Multicasting", IEICE Trans. Commun., vol. 87, 2004, pp. 3057-3067.

Draft ETSI TS 182 028 V3.1.0 (Nov. 2008), "Telecommunications and Internet Converged Services and Protocols for Advanced Networking (TISPAN); NGN Integrated IPTV Subsystem Architecture", pp. 1-45.

Draft ETSI TS 181 016 V3.1.1 (Jul. 2008), "Telecommunications and Internet Converged Services and Protocols for Advanced Networking (TISPAN); Service Layer Requirements to Integrate NGN Services and IPTV", pp. 1-44.

Draft ETSI TS 181 016 V3.0.2 (Jul. 2008), "Telecommunications and Internet Converged Services and Protocols for Advanced Networking (TISPAN); Service Layer Requirements to Integrate NGN Services and IPTV", pp. 1-43.

Draft ETSI TS 181 016 V0.0.9 (Sep. 2007), "Telecommunications and Internet Converged Services and Protocols for Advanced Networking (TISPAN); Service Layer Requirements to Integrate NGN Services and IPTV", pp. 1-31.

"Benefits of multiplexing," Alcatel, TSG-RAN Working Group 3#18, TSGR3#18(01) 0120, Jan. 2001.

* cited by examiner

METHOD AND SYSTEM FOR SYNCHRONIZING A GROUP OF END-TERMINALS

FIELD OF THE INVENTION

The invention relates to method and system for synchronizing a group of end-terminals. The invention further relates to a synchronization unit and to a network node for use in such system.

BACKGROUND OF THE INVENTION

New multi-media techniques such as Voice over IP (VoIP) and Internet Protocol Television (IPTV) open a whole range of new multi-media services. One type of these services enable a group of users to separately watch the same TV channel and communicate with each other using text, audio and/or video. Such services require that the output signal of the end-terminals is transmitted at the same time to all users in the group. In other words, the outputs of the display devices in the group, e.g. televisions, PDAs, mobile devices, PCs or a combination thereof, should be synchronized.

In an IPTV system the TV channel signal is typically transmitted as one or more packetized streams over an high-bandwidth IP network of an operator via network nodes such as head ends, edge routers and access nodes to the end-terminals of the subscribers to such services. During transmission of the streams, the packets are subjected to unknown delays in the network such as transmission delays, differences in network routes and differences in coding and decoding delays. As a consequence the temporal relationship between packets of audio and video streams received at one end-terminal and those received at another end-terminal will be disturbed.

To stream the IPTV content to the end-terminals usually the Real-Time Transport Protocol (RTP) is used. RTP provides sequence numbering and time stamping. Using RTP the temporal relation in one stream (intra-stream synchronization) and between associated streams (inter-stream synchronization) can be restored.

In order to achieve group-synchronization or inter-destination synchronization (as required by the services as referred to above) further measures are necessary. Several techniques are known and all employ time-stamping and variable-delay buffers in the end-terminals. A variable-delay buffer is capable of delaying a stream for a certain amount of time.

In the article "An Application-Level QoS Comparison of Inter-Destination Synchronization Schemes for Continuous Media Multicasting" by Nunome et al. (IEICE trans. Commun. vol. 87, 2004, pp. 3057-3067) two types of inter-destination synchronization schemes are described. A first type uses a central synchronization master, which collects timing information from all end-terminals in the group and adjusts the output timing by distributing control packets to the end-terminals. A second type regards a distributed control scheme, wherein each end-terminal multicasts all timing information to all other end-terminals in the group. Implementation of such schemes in a typical IPTV system introduces however certain problems.

A first problem relates to the limited scalability of the proposed schemes. A central synchronization master is only capable of handling a limited number of end-terminals. Further, a distributed scheme requires a multitude of multicast channels, which is a limited resource.

A second problem relates to the use of controllable variable-delay buffers in the end-terminals. These buffers and the additional functionality for receiving and transmitting timing information imply increased costs of the end-terminal and the inability to use legacy terminals that do not have these capabilities. Moreover, if a user of an end-terminal joins a synchronized group, the local buffering at the end-terminals takes a significant adaptation time before the user is in synchronization with the other end-terminals in the group.

SUMMARY OF THE INVENTION

It is an object of the invention to reduce or eliminate at least one of the drawbacks of synchronization schemes known in the prior art and to provide a method for synchronizing transmission of streams received by end-terminals, the end-terminals being connected to network nodes, the method comprising the steps of:
  receiving first arrival time information of a packet in a stream arriving at a first network node and second arrival time information of a packet in the stream arriving at a second network node;
  calculating delay information on the basis of the first and second arrival time information;
  providing the first network node and the second network node with the delay information enabling one or more variable delay units in the first and second network node to delay transmission of the stream to end-terminals connected to the first and second network node such that the streams received by the end-terminals are substantially synchronized.

In one embodiment the method according to the invention is used in a system comprising a station transmitting a packetized stream to at least a first network node, preferably a first access node, connected to a first set of end-terminals in the group and to a second network node, preferably a second access node, connected to a second set of end-terminals in the group. Each network node comprises a variable delay unit and is capable of determining the arrival time of packets in the stream. Further, each network node is connected to at least one synchronization unit for calculating delay information.

The method comprises the steps of: (i) receiving first arrival time information of a packet arriving at the first network node, preferably a first access node and second arrival time information of a packet arriving at the second network node, preferably a second access node; (ii) calculating delay information for the first and second network node on the basis of the first and second arrival time information; and (iii) providing the first network node and second network node with the delay information enabling the variable delay unit of the network node to delay transmission of the stream to the end-terminals such that the output of the group of end-terminals is substantially synchronized.

The method effectively synchronizes the output of the end-terminals connected to the network nodes. Preferably access nodes are synchronized, as the network delays are mainly generated within the network and less so in the access lines connecting the access nodes to the end-terminals. By synchronizing all or at least a large group of access nodes in the network of the operator all viewers connected with an end-terminal, e.g. a set-top box, to these synchronized access nodes are capable of viewing the broadcasted program, such as a live soccer game, at the same time. The invention thus allows large groups of viewers to watch a TV channel in a synchronized way.

The method according to the invention further eliminates the necessity of an adaptive-delay buffer and associated electronics in the end-terminals. Every stream transmitted by the network nodes over the access line to the end-terminals is in sync. Moreover, when changing to another TV channel the output of the end-terminal is automatically in synchronization with the other end-terminals in the group watching that particular TV channel.

In one embodiment of the invention the first and second arrival time information are determined on the basis of the time of a central clock, for example an NTP server or NTP synchronized clock. The use of a central clock in the network allows simple and accurate calculation of the delays. Further, using a central clock the network nodes do not need to be aware of each other.

In a further embodiment of the invention the first and second arrival time information are determined on the basis of the time of a first clock located at the first network node and a second clock located at the second network node. The use of local clocks does not require an external clock synchronization method to be implemented in the network nodes. Further, the use of local clocks is oblivious to time zones and thus does not require knowledge in which time zone the network nodes are located.

In one embodiment the system comprises one synchronization unit performing the steps as defined in the method as described above.

In one embodiment the first and second network node are connected to at least one synchronization unit for providing the network nodes with delay information.

In a further embodiment, the synchronization unit further performs the step of: calculating from the delay information a first delay for use in the variable delay of the first network node and a second delay for use in the variable delay of the second network node, and transmitting the first delay to the first network node and/or the second delay to the second network node. This way the synchronization unit calculates both the delays and transmits the appropriate delay to each network node.

In one embodiment the synchronization unit may be located in a server or, in another embodiment, in the first network node or the second network node.

In a further embodiment the first and second network node comprise a first and second synchronization unit respectively, wherein each network node also comprises means for communicating arrival time information to the other network nodes. The method comprises the steps of:
  the first synchronization unit receiving the second arrival time information transmitted by the second synchronization unit;
  the second synchronization unit receiving the first arrival time information transmitted by the first synchronization unit;
  the first and second synchronization unit calculating a first and second delay respectively on the basis of the first and second arrival time information enabling the variable delay unit in the first and second network node to delay transmission of the stream to the end-terminals such that the output of the group of end-terminals is substantially synchronized.

Using a synchronization unit located at each network node eliminates the use of central synchronization unit in the network.

In one embodiment at least one synchronization unit further performs the steps of:
  obtaining the transmission rate of the stream;
  selecting a reference packet;
  calculating the arrival time of the reference packet at each network node;
  determining the delay information by calculating the delays for each network node relative to the most lagged network node.

Collection of the arrival time information of a packet at each network node and the transmission rate of the stream and selection of one packet as the reference packet allows the synchronization unit to calculate the arrival time of the reference packet at each network node. It further allows the synchronization unit to determine, which network node is the most lagged network node (i.e. the network node which was the last to receive the reference packet).

In yet a further embodiment the packet in the stream comprises a time-stamp and/or a frame number. In another embodiment the stream is a multicast stream.

In alternative embodiments the network node may be an access node, such as an Digital Subscriber Line Access Multiplexer (DSLAM), an Cable Modem Termination System (CMTS), an optical access node or an edge router.

In an embodiment the method further comprises the step of receiving a request for synchronization.

In a further embodiment a synchronization domain comprises of a group of variable delay units and a synchronization unit is capable of substantially synchronizing at least one synchronization domain. the method further comprising the steps of:
  receiving delay information about a synchronization domain
  calculating a delay for the synchronization domain
  providing the synchronization domain with said delay enabling the relevant variable delay units to delay transmission of the stream to the end-terminals such that the streams received by the end-terminals are substantially synchronized.

Alternatively the network node that locates the variable delay unit may be a head end, a core router or another functional element that is part of the transport function of a network and that is located in the path of the stream.

Alternatively, there may be variable delay units in multiple of the network nodes in the path of the stream. For example, there may be variable delay units in both the head ends and in the access nodes. The variable delay units in head ends may take care of large delay variations between different networks (e.g. IPTV, DVB-H, DVB-T, UMTS, each with their own head ends), whereas variable delay units in access nodes may take care of fine-tuning adjustment additional small delay variations at the different access nodes in each network. This way, by segmenting the total delay over various levels in a network, a form of concatenated synchronization may be achieved.

The invention also relates to a system for synchronizing the output of a group of end-terminals comprising: a station transmitting a packetized stream; at least a first network node, preferably a first access node, connected to a first set of end-terminals in the group and a second network node, preferably a second access node, connected to a second set of end-terminals in the group, each network node comprising a variable delay unit and is capable of determining arrival time information of a packet in the stream; and, at least one synchronization unit connected to the network nodes, the synchronization unit comprising: means for receiving first arrival time information of a packet arriving at the first network node, means for receiving second arrival time information of a packet arriving at the second network node, means for calculating delay information for the first and second network node on the basis of the first and second arrival time information, and means for providing the delay information to the first network node and second network node.

The invention also relates to a synchronization unit and a network node for use in a system as described above. In a further aspect the invention relates to a synchronization unit, preferably a synchronization server for synchronizing transmission of streams received by end-terminals comprising:
- means for receiving first arrival time information of a packet in a stream arriving at a first network node and second arrival time information of a packet in the stream arriving at a second network node;
- means for calculating delay information on the basis of the first and second arrival time information;
- means for providing the first network node and the second network node with the delay information enabling one or more variable delay units in the first and second network node to delay transmission of the stream to end-terminals connected to the first and second network node such that the streams received by the end-terminals are substantially synchronized.

In yet another aspect the invention relates to a synchronization unit, preferably a synchronization server, for synchronizing the output of a group of end-terminals wherein a first set of end-terminals in the group is connected to a first network node, preferably a first access node and a second set of end-terminals in the group is connected to a second network node, preferably a second access node, the synchronization unit comprising means for receiving first arrival time information of a packet from a packetized stream arriving at the first network node and receiving second arrival time information of a packet arriving at the second network node, means for calculating delay information for the first and second network node on the basis of the first and second arrival time information, and means for transmitting the delay information to the first network node and second network node.

In yet another aspect the invention relates to a network node for use in a system described above comprising:
- at least one variable delay unit;
- means for transmitting the arrival time of a packet in the stream to the synchronization unit; and
- means for receiving delay information for the at least one variable delay unit enabling the network node to transmit the stream to the end-terminals at a predetermined point in time.

In yet a further aspect the invention relates to a computer program product comprising software code portions configured for, when run in the memory of a network node, executing the method steps as described above The invention will be further illustrated with reference to the attached drawings, which schematically show embodiments according to the invention. It will be understood that the invention is not in any way restricted to these specific embodiments.

DETAILED DESCRIPTION

Figure 1:
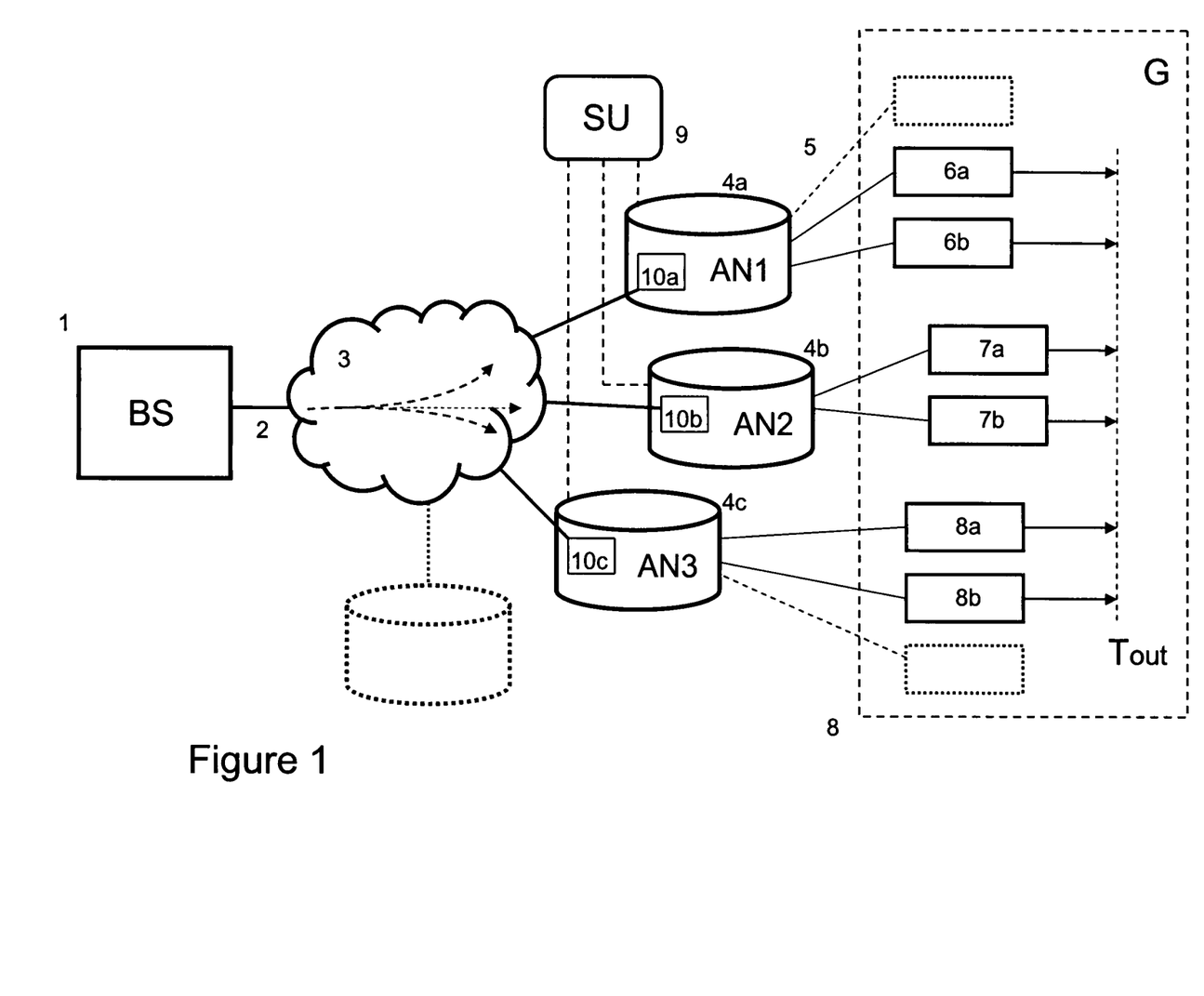
FIG. 1 depicts an exemplary embodiment of the invention comprising a central synchronization unit.

FIG. 1 illustrates a first system according to the invention. A broadcast station (BS) 1, preferably an IPTV system, e.g. an IPTV system having an IMS-type architecture, transmits a packetized transport stream 2, typically a multicast stream, via a network 3, e.g. a high bandwidth IP network, of an operator to a number of access nodes (AN1, AN2, AN3, ...; 4a, 4b, 4c, ...).

The video content in the stream may be compressed using for example MPEG-2 or MPEG-4. Further, the Real-time Transport Protocol (RTP) may be used to stream the IPTV content over the network. The services provided by RTP include sequence numbering, time stamping and delivery monitoring allowing synchronization of the packets in one stream and between associated streams so that consecutive frames in a stream are played at the correct time.

The access nodes may be an Digital Subscriber Line Access Multiplexer (DSLAM), an Cable Modem Termination System (CMTS), an optical access node or an edge router. The access node may be generally defined as the last or one of the last active components in the transport network of the operator, connecting the high bandwidth network 3 via access lines 5 e.g. DSLs, to a set of end-terminals (6a, 6b; 7a, 7b; 8a, 8b). Alternatively the access lines connecting the end-terminals to the access nodes may be any type of wireless network (such as WI-FI, UMTS etc.). As the access nodes are located at the edge (or border) of the network, the access lines from the access node to the end-terminals are therefore substantially free of delays in the network (e.g. transmission delays, differences in network routes and differences in coding and decoding delays). Synchronization of the access nodes thus effectively synchronizes the output of a group of end-terminals connected to the access nodes.

Each access node may connected to a set of end-terminals (i.e. one or more end-terminals) and each end-terminal may be connected to one or more display units. The sets of end-terminals (6a, 6b; 7a, 7b; 8a, 8b) form a group (G) 8 of end-terminals to which one or more IPTV services may be delivered. In one embodiment the end-terminal may be a set-top box (STB) connected to the display unit. In another embodiment, the end-terminal may be hardware unit in the display unit. The display unit may be a television, a personal computer, a personal digital assistant (PDA), a mobile terminal or any other device capable of presenting the audio/video stream to a user. The end-terminal may use the Internet Group Management Protocol (IGMP) to request the access node to transmit a selected TV channel to the end-terminal.

Synchronization of the output of the end-terminals is realized by a synchronization unit 9. The synchronization unit may be located as a functional unit in a server, e.g. a dedicated synchronization server, in the network 3 or in one of the access nodes. It allows the access nodes to compensate the network delays in the network 3 (e.g. the processing-, queuing-, routing-, transmission- and propagation delays in the network). To that end, each access node comprises at least one variable-delay buffer 10a, 10b, 10c capable of delaying the transmission of a stream to the end-terminals.

The synchronization method according to the invention may be implemented as a continuous process operating e.g. on a whole network or parts thereof, or operating on all streams running through the network or certain streams only. Further, the continuous operation may affect all end-terminals or only certain end-terminals. The method may be implemented by configuring the system to operate in this continuous modus.

Alternatively, the method may be implemented as a session-type synchronization process using e.g. a client-server type model. Synchronization sessions may for example be initiated or terminated through certain triggers within the network. Triggers for initiating or terminating a synchronization session may for instance be provided by end-terminals (see detailed description of FIG. 6) or by other elements within the network or system itself.

In one embodiment, the variable delay unit and the synchronization unit may be implemented in a client-server type model wherein each variable delay unit in a network node acts as a synchronization client (SC) and the synchronization unit act as a synchronization server (SYNCHS, also known as Media Synchronization Application Server, MSAS). The synchronization client (variable delay unit) may have a protocol socket enabling synchronization status information to be sent using a suitable protocol to the synchronization server (synchronization unit), and synchronization settings instructions to be received from the synchronization server. Synchronization status information may include timing information on stream reception (i.e. at what point in time a given stream was received) and the current delay settings. Synchronization settings instructions may include instructions on setting the variable delay unit.

The synchronization server (synchronization unit) and synchronization client (variable delay unit) may be configured to initiate and terminate synchronization sessions. A synchronization session may be initiated when a synchronization client sends an invitation message to the synchronization server, or vice versa. During a synchronization session, the synchronization server and the synchronization client may exchange synchronization status information and synchronization settings instructions. A synchronization session may be terminated when the synchronization client sends a termination message to the synchronization server, or vice versa. A synchronization server and a synchronization client may send return messages to accept the invitation to, or to confirm the termination of a synchronization session.

FIG. 1 illustrates a central synchronization scheme in which the synchronization unit 9 collects arrival time information from the access nodes and calculates delay information for the variable-delay buffer in the access nodes. The algorithm used by the synchronization unit assumes that the frame-rate, i.e. the number of frames per second of the streaming content (e.g. video), is known.

Figure 2:
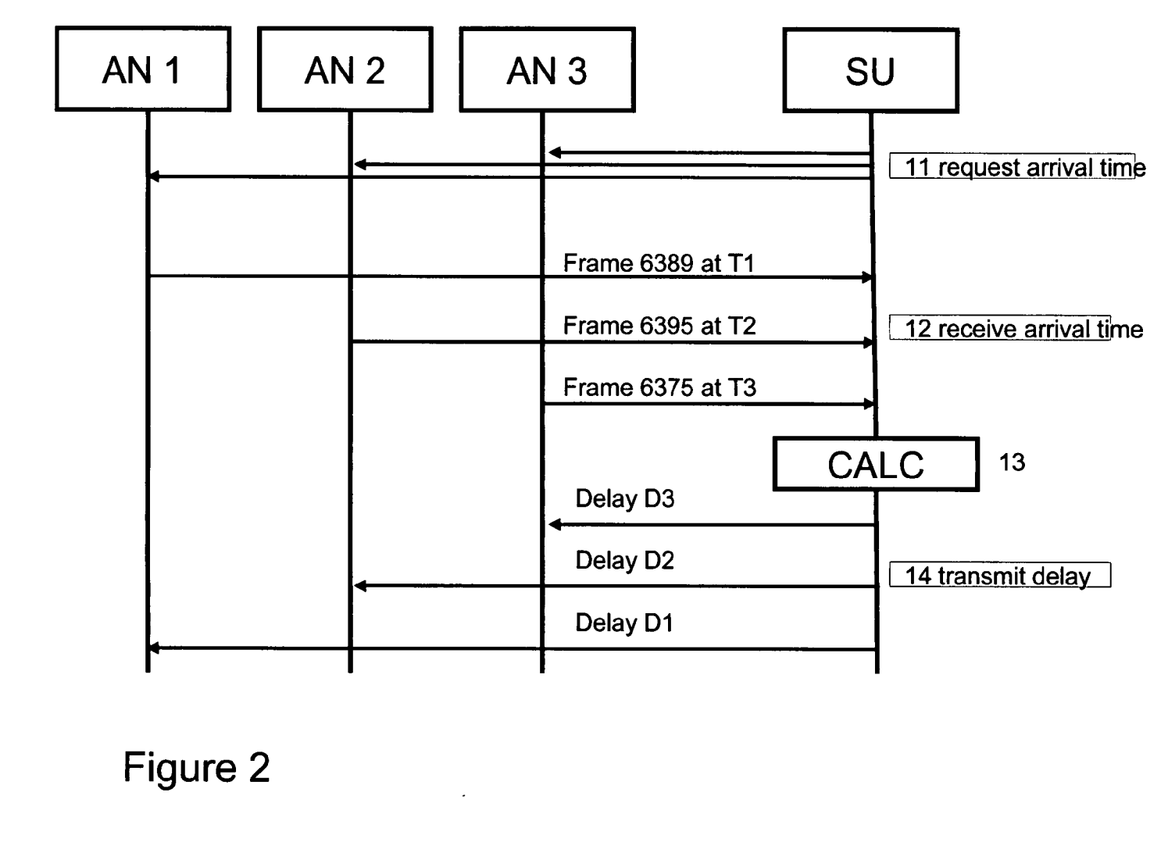
FIG. 2 depicts the flow of information in a system according to the invention comprising a central clock and a central synchronization unit.

The information transfer between the synchronization unit and the access nodes is illustrated in more detail in FIG. 2. In a first step 11 the synchronization unit requests the access nodes to send the arrival time information of a particular video frame in the stream. In a second step 12 the access nodes will send this information, typically RTP information of a frame including the frame number and the time of arrival (T1, T2, T3) of the frame at the access node, to the synchronization unit. Thereafter, the synchronization unit will calculate in a third step 13 the delay information. To that end, the synchronization unit is capable of: (i) selecting one of the frame numbers, preferably the lowest or highest reported by the access nodes, as a reference frame, (ii) calculating for each access node the time related to this reference frame using a known frame-rate, (iii) determining the most "lagged" access node and (iv) calculating the delays for the other access node or nodes. After calculation the delays are transmitted in a forth step to the access nodes.

The synchronization unit in FIG. 2 receives the following arrival time information from the access nodes AN1, AN2 and AN3:

AN1 received frame 6389 at 14:46:59:2645 (T1)
AN2 received frame 6395 at 14:47:05:4112 (T2)
AN3 received frame 6375 at 14:46:59.7600 (T3)

Given a frame rate of 25 frames per second, the clock times for the lowest frame number, i.e. frame 6375, for each access node can be calculated. The first access node received frame 6375 at T1-(6389−6375)/25=14:46:58.7045 (T1'), the second access node received frame 6375 at T2-(6395−6375)/25=14:47:04.6112 (T2') and the third access node received frame 6375 at T3=14:46:59.7600 (T3'=T3):

AN1 received frame 6375 at 14:46:58.7045 (T1')
AN2 received frame 6375 at 14:47:04.6112 (T2')
AN3 received frame 6375 at 14:46:59.7600 (T3'=T3)

The most "lagged" access node, i.e. the access node which received the reference frame 6375 last, is access node AN2, so the synchronization unit determines the delays for each access node as follows:

Delay D1 for AN1=T2'−T1'=5.9067
Delay D2 for AN2=0
Delay D3 for AN3=T2'−T3'=4.8512

These delays are subsequently sent to the access nodes and used by the variable delay buffer to delay transmission of the stream to the end-terminals. That way the content of a particular frame in the originally transmitted stream is transmitted to all users in the group at the same time $T_{out}$ as schematically indicated in FIG. 1.

In the central scheme described above the access nodes obtain their time from a central clock. In another embodiment, it is also possible to use local clocks, e.g. clocks located at the access nodes, to synchronize the output of the access nodes. In that scheme the Network Time Protocol (NTP) may be used to synchronize the local clocks in the access nodes before calculating the delays.

Alternatively, if very low delay connections between the access nodes are available, the access nodes may share their clock time with each other. In reporting the frame numbers to the central synchronization unit, the access nodes not only report their own clock time, but also the clock time of the others. This way the synchronization unit first may synchronize the clocks of the different access nodes by (i) picking one clock as the reference clock, (ii) calculating per clock the difference with the reference clock, and (iii) adjusting all clock times such that they are reference clock times. Thereafter, the delays may be calculated as described above in the central clock/central synchronization unit scheme.

It is noted that the invention is not limited to synchronization of the access nodes as described above in relation with FIGS. 1 and 2. Depending on factors like the level of synchronization, network economics and network architecture, other type of network elements (network nodes) in the transport network 3 may be used as a synchronization node, i.e. a node in which a variable-delay buffer is located.

For example, in one embodiment the network 3 may comprise two or more networks of different types, e.g. a mobile network and a fixed network, which need to be synchronized with each other with regard to e.g. a broadcast of a live event. In that situation, the variable delay unit may be located in the head end of each of the networks.

It is noted that synchronization between networks may not only be advantageous for different users using different networks and wanting to experience the same broadcast at the same moment, it may also be beneficial for a single user switching between networks. This switching may occur for example when a user uses a mobile network with bad coverage. If a user looses his connection to that network he may want to switch to another network, e.g. another mobile network, with improved coverage. An example of such network switching may be the switching between an DVB-H (Digital Video Broadcast-Handheld) network and an UMTS-network.

The switching may also occur between a mobile network and a fixed network, for example when a user watching a video stream via a mobile network, comes home and wants to continue watching on his large-screen television connected to a fixed network. Cancelling delays between the different networks for a particular stream may thus provide for a seamless network transition and improve the user experience.

Figure 3:
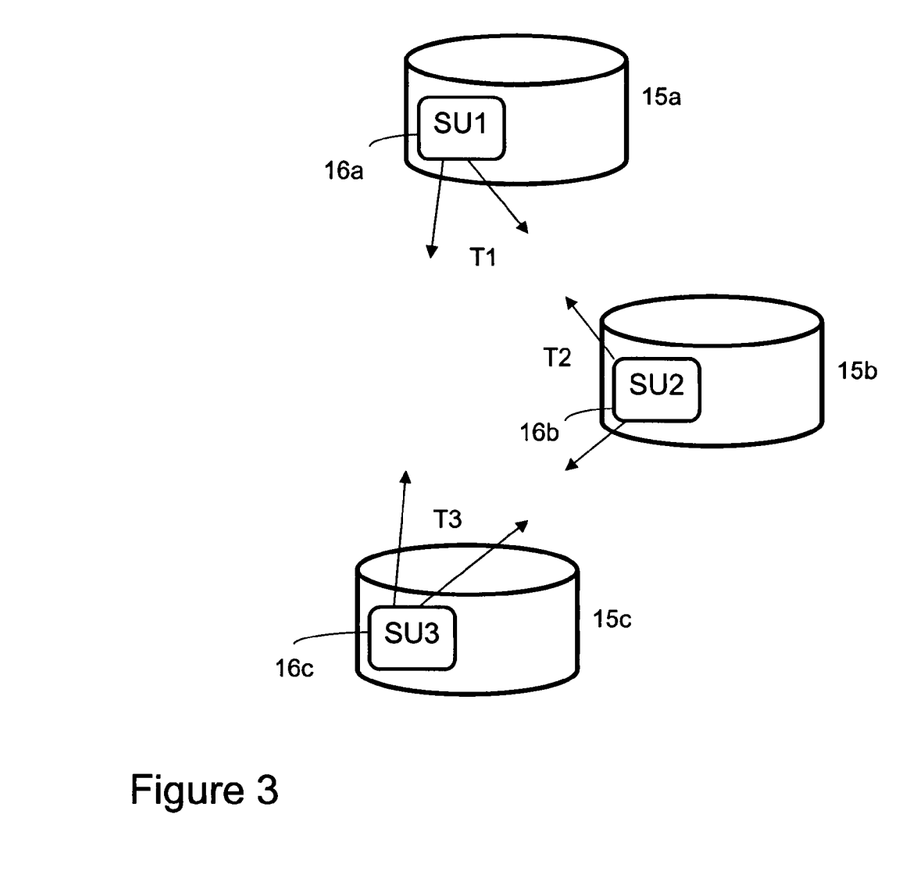
FIG. 3 depicts an exemplary embodiment of a distributed synchronized system.

In a further embodiment a number of synchronization units may be used, which are distributed, e.g. in a distributed server scheme, over the network. FIG. 3 depicts an example of such distributed scheme wherein each access node 15a, 15b, 15c comprises a synchronization unit SU1, SU2, SU3. Each synchronization unit is capable of transmitting the arrival time information T1, T2, T3 of a frame arriving at the access node in which the synchronization unit is located to all other synchronization units. Each synchronization unit is thus capable of calculating the appropriate delay time for the variable-delay unit in a similar way as discussed above.

Figure 4:
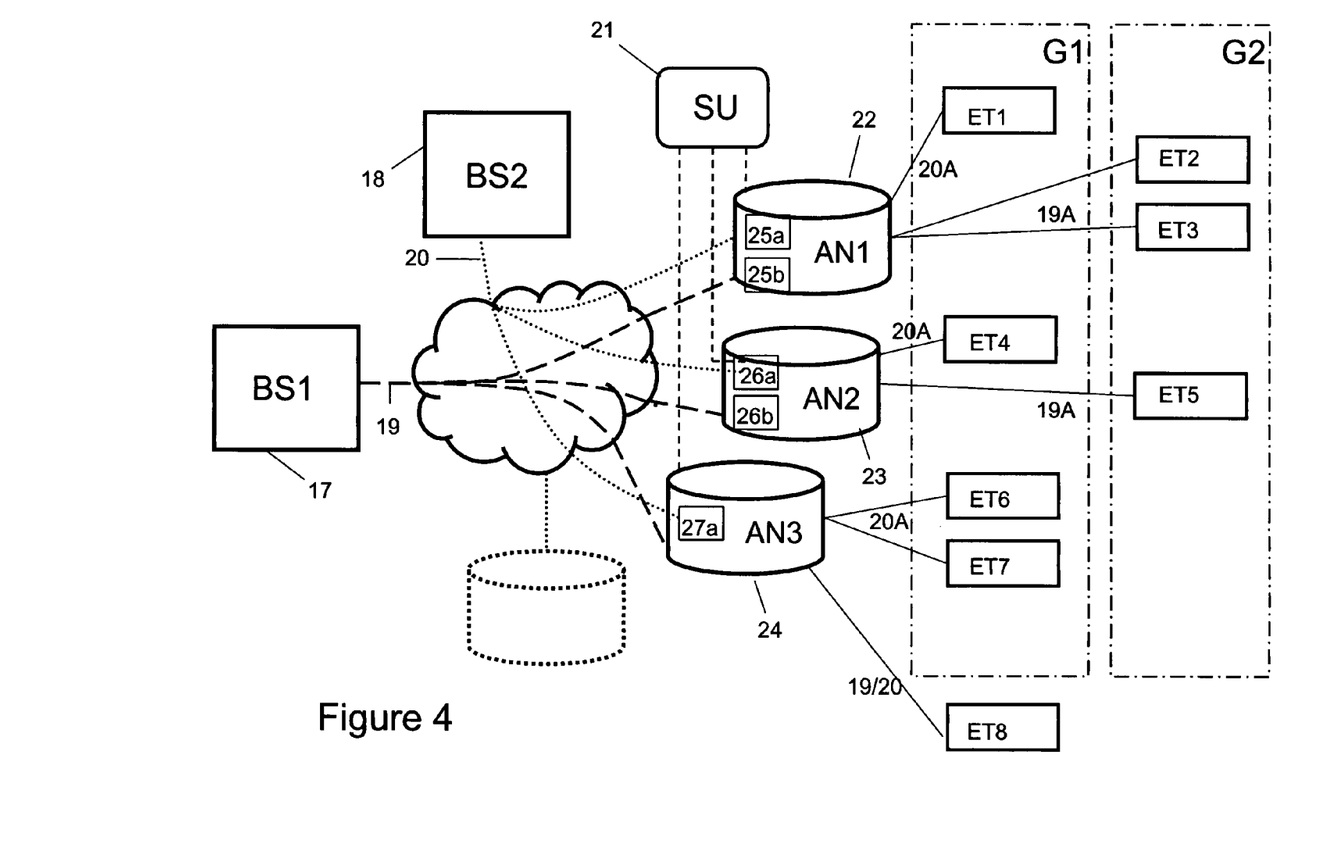
FIG. 4 depicts an exemplary embodiment of a network topology with a multiple of stations, transmitting from different locations

In yet another embodiment the network node comprises multiple variable delay units. This may be advantageous, when different transmitting stations, transmitting different streams (broadcast channels) cause different delays between network nodes. FIG. 4 shows an exemplary network architecture with two broadcast sources BS1 (17) and BS2 (18), transmitting broadcast streams 19, 20 to network nodes AN1 (22), AN2 (23) and AN3 (24) from two different locations. For example, BS2 may be a satellite ground station, geographically located in the north of a country wide network and transmitting a broadcast stream from a northern access point into the network and BS1 (geographically located in the centre of a country wide network) may be receiving a broadcast stream via a terrestrial connection and is transmitting from a central access point into the network. Because of these different access points, the broadcast streams 19 and 20 could cause different delays between AN1 (22), AN2 (23) and AN3 (24). Consequently if two different streams, transmitted from different sources, causing different delay patterns, require inter-destination synchronization, at least two variable delay units per network node involved, are needed to correctly synchronize the streams.

This principle is further illustrated in FIG. 4: End-terminals ET 1,4,6,7 are part of group G1, G1 receiving a substantially synchronized stream 20A. For synchronizing the output of G1 (by outputting the synchronized streams 20A by the network nodes AN1, AN2 and AN3)), the variable delay units 25a, 26a and 27a are needed.

On the other hand end-terminals ET 2, 3, 5 may be part of group G2, G2 receiving a substantially synchronized stream 19A. For synchronizing the output of G2 (by outputting the synchronized streams 19A by the network nodes AN1, AN2 and AN3), the variable delay units 25b and 26b are needed.

For each of the variable delay units (25a, b; 26a, b and 27a), the network nodes have to transmit packet arrival time information to the synchronization unit 21, and the synchronization unit has to calculate and transmit delay information for each variable delay unit in the network node.

As illustrated by FIG. 4. not all end-terminals necessarily need to be part of a group. ET8 may for instance receive one of the unsynchronized streams 19/20 directly, without the involvement of a variable delay unit.

In another embodiment, in a network node only one variable delay unit per transmitting broadcast station is required. Instead of applying inter-destination synchronization for each individual stream, the inter-destination synchronization is applied to a bundle of streams transmitted from one transmitting station, whereby the streams within the bundle each cause substantially similar delay patterns in the network.

Figure 5:
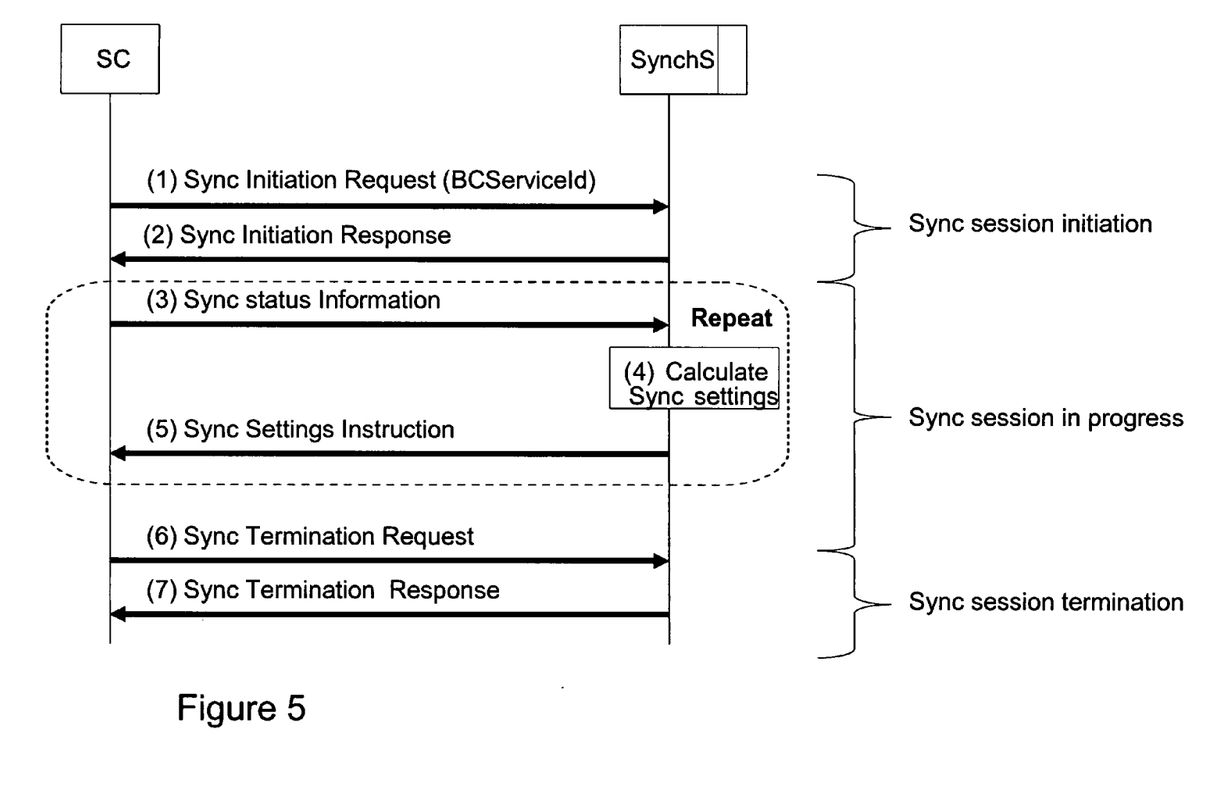
FIG. 5 depicts an exemplary embodiment of a synchronization session

FIG. 5 depicts an exemplary messaging flow of a synchronization session between a synchronization client (SC) and a synchronization server (SYNCHS, also known as Media Synchronization Application Server, MSAS) according to one embodiment of the invention. The SC en the SYNCHS may be implemented in an IMS-type architecture wherein the synchronization client may be e.g. an elementary function of the Basic Transport Functions (BTF) and the synchronization server may be an elementary function of the Media Distribution Function (MDF), the Media Control Function (MCF) or the Service Control Function (SCF) as defined in ETSI technical specification TS 182027, which is hereby incorporated by reference. Alternatively, the synchronization server may be a dedicated function element in the network, such as an application server(AS)

The synchronization session may comprise the following steps:

In a first step (1) the SC sends a synchronization initiation request to the SYNCHS, indicating that it wants to participate in the inter-destination synchronization process. The request may include information required for the synchronization session, e.g. channel identification information (BCServiceId) of the broadcast channel which for which synchronization is requested. In a second step (2) the SYNCHS confirms the participation of the SC in the inter-destination synchronization process. In a third step (3) the SC sends its synchronization status information to the SYNCHS. In a fourth step (4) the SYNCHS aggregates synchronization status information from multiple SC's and calculates the appropriate synchronization settings for each SC. The synchronization settings instructions from collected synchronization status information may be calculated using the algorithm as described in relation with FIG. 2. In a fifth step (5) the SYNCHS sends a synchronization settings instruction to the SC. Steps 3-5 may be repeated at regular time intervals. When the synchronization session needs to be terminated the SC sends in a sixth step (6) synchronization termination request to the SYNCHS, indicating that it is no longer active in the inter-destination synchronization process. In a seventh step (7) the SYNCHS confirms the termination of the SCs participation in the inter-destination synchronization process.

Figure 6:
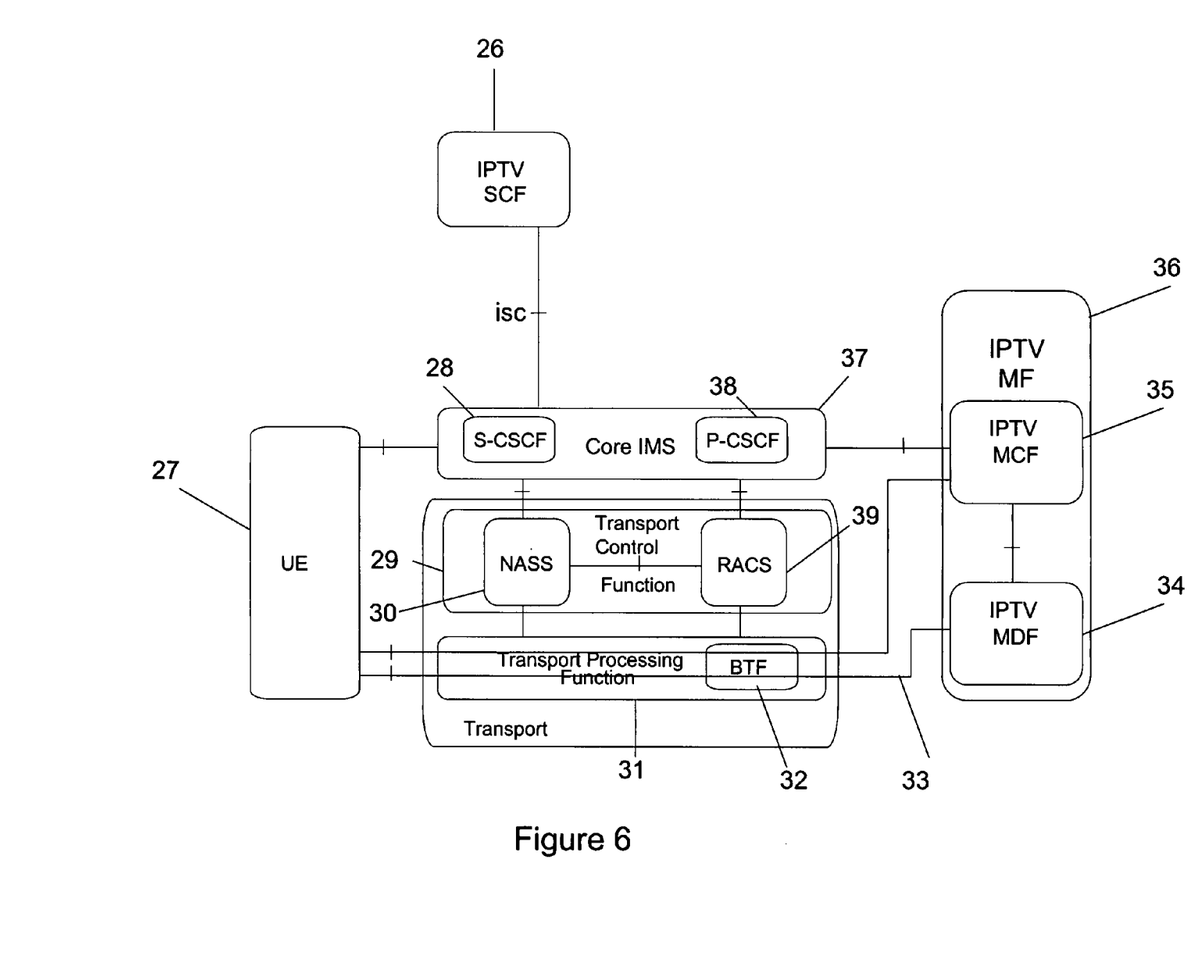
FIG. 6 depicts an exemplary architecture of a system configured for implementing the invention

The synchronization method according to the invention may be implemented in an IMS-based IPTV architecture as depicted in more detail in FIG. 6 and described in more detail in ETSI technical specification TS 182027. In this architecture the Media Distribution Function MDF 34 represents the transmitting station and the IPTV broadcast session 33 represents the packetized stream transmitted from the MDF to the user equipment UE 27.

In a scenario where two subscribers of an IMS based IPTV service want to watch the same TV program (e.g., a football game) in a synchronous modus and communicate by (video) telephone or chat at the same time, an acceptable user experience requires the IPTV streams on both TVs to be synchronized (e.g. to avoid hearing a reaction of a user seconds before the users actually see a goal on the TV). Synchronization in such IMS-based IPTV system may be achieved using the following process.

In a first step, the user may enable synchronization for the existing unsynchronized IPTV broadcast session by requesting a session modification (where the Media Distribution Function MDF 34 is the transmitting station and the IPTV broadcast session is the packetized stream). The session modification involves the UE 27 (end-terminal) sending a SIP INVITE message (i.e. a "trigger") to the SCF 26 comprising an updated session description (using the Session Description Protocol, SDP). The session description may contain information about which IPTV stream should be synchronized (e.g., indicated by the BCServiceId), the UE's 27 involved in the synchronization session, and possible additional information. This SIP INVITE message is routed via the Proxy Call Session Control Function (P-CSCF) 38 located in the Core IMS 37 to the SCF 26.

In a second step, the SCF 26 may accept the request and instruct the MSAS (i.e. the synchronization unit) to start the synchronization session for inter-destination synchronization.

Depending on the location of the MSAS in the IMS IPTV system different protocols may be used to set up the synchronization session. If the MSAS is located in the SCF 26 an internal protocol may be used, if the MSAS is located in the Media Control Function (MCF) 35 (the MCF is part of the IPTV Media Function (MF) 36) an SIP protocol may be used and if the MSAS is located outside the SCF 26 a remote procedure call protocol such as SOAP or RPC could be used.

If the MSAS is located in the Resource Admission Control Subsystem (RACS) 39, the SCF 26 does necessarily not has to instruct the MSAS to start the synchronization session as the P-CSCF 38 that receives the SIP INVITE in its role as a SIP router in the Core IMS 29, has a direct interface with the RACS. The P-CSCF 38 is therefore capable of instructing the MSAS located in the RACS 39 using this interface based on the Diameter protocol. The MSAS may then re-use the interface of the RACS 39 towards the Basic Transport Functions (BTF) 32 based on the Diameter protocol for the synchronization activities, with the BTF having synchronization client functionality.

In a third step—after the MSAS is instructed to start the synchronization session—the MSAS has to determine the relevant Basic Transport Functions BTF 33 (i.e. the relevant network nodes with one or more variable delay units) within the Transport Processing Function 23. The MSAS may obtain this information by operator configuration, an end-terminal network attachment (by querying/subscribing to the Network Attachment Subsystem (NASS) 20 using the Diameter protocol), or via an IMS registration (by subscribing to registration events of the Serving Call Session Control Function (S-CSCF) 38 using SIP).

The MSAS then sets up synchronization sessions with each BTF 33 using e.g. the SIP protocol. The request may include information required for the synchronization session, e.g. channel identification information (BCServiceId) of the broadcast channel for which synchronization is requested. This information can be included in the session description of the SIP request.

In a fourth step—after the synchronization session is accepted—the relevant BTFs 32 (i.e. the relevant network nodes) send their synchronization status information (comprising packet arrival time information of a packet of the to be synchronized stream arriving at the relevant BTF) to the MSAS, using a SIP INFO request (e.g. the status encoded in XML) or other protocol as part of the established synchronization session.

The MSAS then calculates the delay information for use in the variable delay unit for each BTF and transmits the delay information to the relevant BTFs thus enabling each BTF to delay transmission of the stream. The protocol used between the MSAS and the BTFs may be based on Diameter or MEGACO instead of SIP.

The system as depicted in FIG. 6 may support both unsynchronized and synchronized channels. For example, a network node comprising a variable delay unit may distribute two version of a single channel: 1) the direct (unsynchronized) version of a channel before the variable delay unit and 2) the synchronized version of the same channel after the variable delay unit.

An end terminal may select a channel (unsynchronized or synchronized), and/or change a selection, using a control protocol, for example IGMP or RTSP. The action of an end terminal selecting a synchronized channel may trigger a network node to initiate a synchronization session, typically if this is the first terminal requesting the synchronized channel. Similarly, the action of an end terminal leaving a synchronized channel may trigger a network node to terminate the associated synchronization session, typically if this is the last terminal leaving the synchronized channel As stipulated before, a drawback of existing synchronization solutions, is their limited scalability, as a single (synchronization) server is only able to handle a limited number of clients. By providing a solution according to the invention, whereby the network nodes are substantially synchronized, each network node is capable of serving a large amount of end-terminals. Nevertheless, for very large networks and/or administrative domains it might be advantageous to further enhance the scalability by introducing a hierarchy of synchronization servers.

Figure 7A:
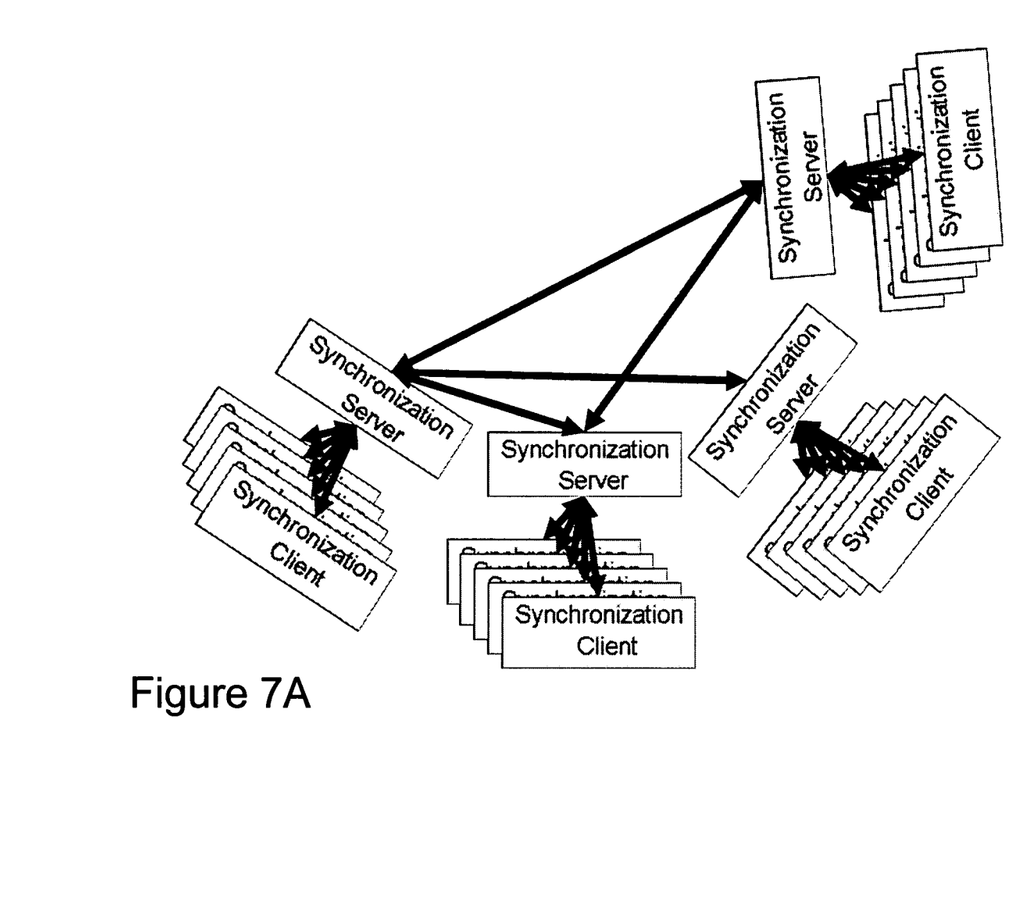
FIG. 7A depicts an example of a scalable synchronization architecture
Figure 7B:
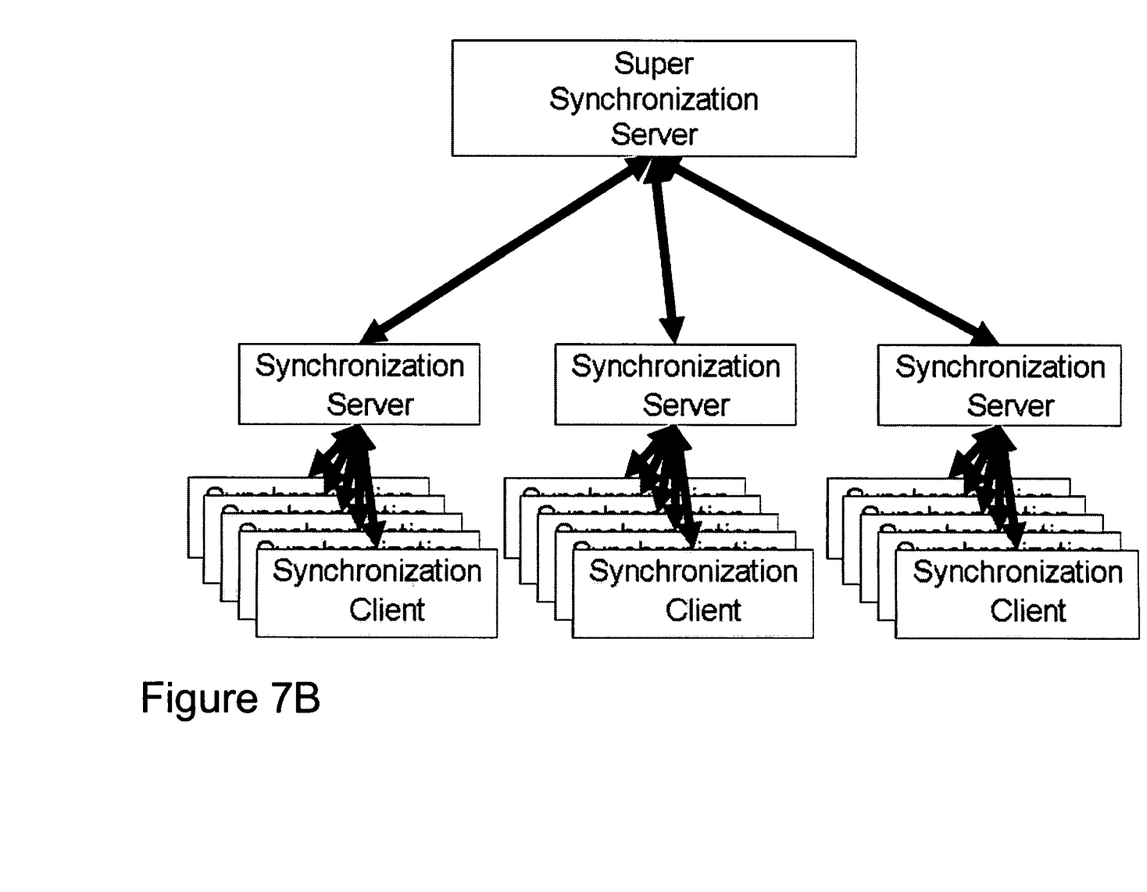
FIG. 7B depicts another example of a scalable synchronization architecture.

FIG. 7A and FIG. 7B depict two exemplary architectures of such a hierarchy. At the lowest level, the synchronization servers (SU) synchronize their assigned synchronization clients located in the network nodes, wherein each group of synchronization clients forms a synchronization domain. At the next level, the synchronization servers are synchronized by means of inter-server synchronization. The inter-server synchronization may take place in a "horizontal" way, in which all servers are each others peers, as shown in FIG. 7A. Alternatively, there may also be one or more super-synchronization servers that synchronize a group of synchronization servers. This embodiment is illustrated in FIG. 7B.

The inter-server synchronization protocol used between (super)-synchronization servers may function in a similar way as the protocol used between synchronization servers and synchronization clients as described above. The inter-server protocol may be used to exchange delay information between the different synchronization domains. It may also be used to send information to set and change play-out delays.

Figure 8:
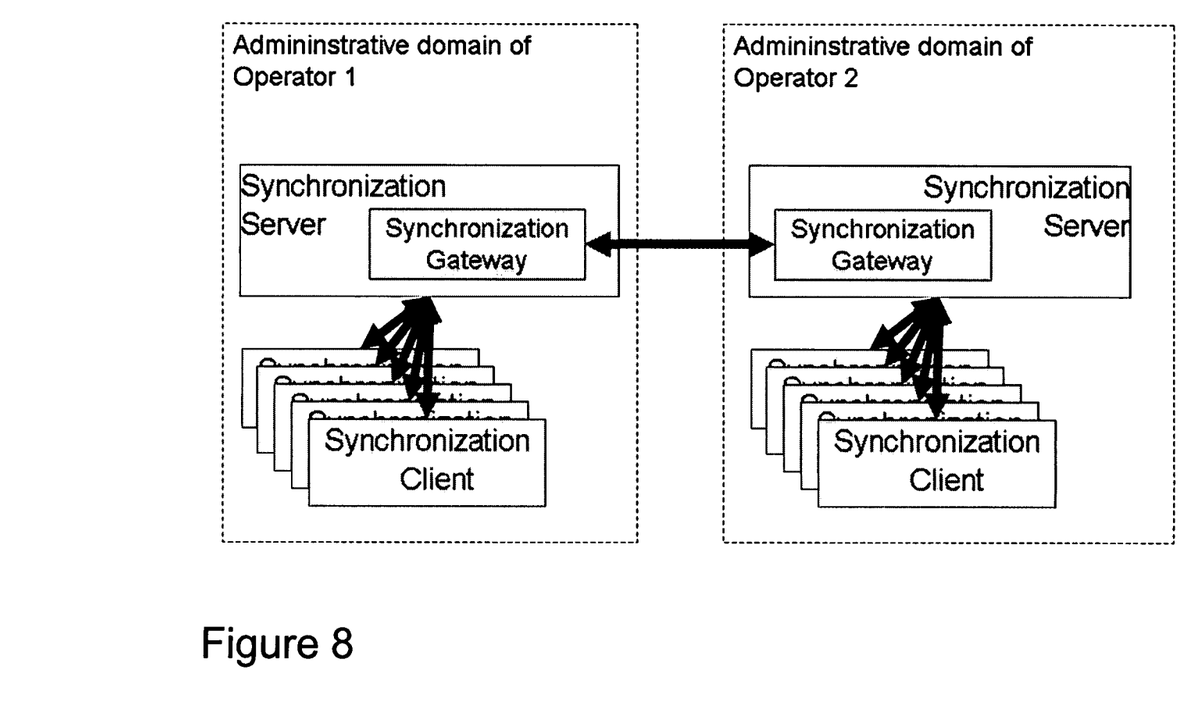
FIG. 8 depicts an exemplary embodiment of an inter-domain synchronization architecture.

As the network nodes may comprise multiple variable delay units, each capable of acting as a synchronization client, it may well be that for large scale synchronization of different streams, a network node may logically be part of different synchronization domains at the same time. The same holds for a synchronization server (i.e. synchronization unit). A synchronization server may be simultaneously part of different synchronization domains and—at a higher level— may be synchronized with different synchronization servers, depending on the stream or set of streams that need synchronization. Hence large scale synchronization may require interaction between network domains, operated by different operator. For this purpose synchronization gateways may be put in between these network domains. The synchronization gateway function, may be part of a Synchronization Server, which is further illustrated by FIG. 8.

Any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for synchronizing the transmission of a stream of packets, wherein a synchronization unit is operable to communicate with a first network node and a second network node, the method comprising:
   the synchronization unit receiving a first arrival time information of a first packet in the stream arriving at the first network node;
   the synchronization unit receiving a second arrival time information of a second packet in the stream arriving at the second network node;
   based on the first arrival time information and the second arrival time information, the synchronization unit calculating delay information; and
   the synchronization unit providing at least one of the first network node and the second network node with the delay information, enabling one or more variable delay units in at least one of the first network node or the second network node to delay transmission of the stream to end terminals connected to at least one of the first network node or the second network node.

2. The method of claim 1, wherein the first packet contains a reference frame, wherein the stream is transmitted at a frame rate, and wherein calculating the delay information comprises:
   based on the frame rate and the second arrival time information, determining an arrival time of the reference frame at the second network node, wherein the arrival time of the reference frame at the second network node is earlier than an arrival time of the reference frame at the first network node; and
   determining the delay information to include a first delay, wherein the first delay comprises a difference between the arrival time of the reference frame at the second network node and the arrival time of the reference frame at the first network node.

3. The method of claim 2, wherein calculating the delay information further comprises:
   based on the arrival time of the first frame at the second network node being earlier than the arrival time of the first frame at the first network node, determining the delay information to include a second delay, wherein the second delay is zero.

4. The method according to claim 1, wherein the synchronization unit is located in one of a server, the first network node, and the second network node.

5. The method of claim 1, wherein each of the first packet and the second packet contain a respective timestamp or frame number.

6. The method of claim 1, further comprising:
   the synchronization unit providing another synchronization unit with the delay information.

7. A method, wherein an network node is communicatively coupled to a synchronization unit, the method comprising:
   the network node transmitting an arrival time information of a first packet to the synchronization unit, wherein the first packet is from a stream of packets;
   the network node receiving a given delay information from the synchronization unit; and
   in response to receiving the given delay information, the network node delaying transmission of a second packet from the stream of packets in accordance with the given delay information; wherein the network node transmits the first and second packets to end-terminals on access lines.

8. The method of claim 7, wherein the network node comprises a first variable delay buffer for delaying transmission of the second packet.

9. The method of claim 7, wherein the network node comprises a second variable delay buffer for delaying transmission of packets from another stream of packets.

10. The method of claim 7, wherein each of the first packet and the second packet contain a respective timestamp or frame number.

11. The method of claim 7, further comprising:
   before the network node transmits the arrival time information of the first packet to the synchronization unit, the network node (i) transmitting an initiation request to the synchronization unit, and (ii) receiving a confirmation from the synchronization unit.

12. The method of claim 11, wherein the initiation request includes channel identification information of a broadcast channel for which synchronization is requested, wherein the broadcast channel is transmitted, at least in part, as the stream of packets.

13. The method of claim 7, wherein the network node comprises one of a Digital Subscriber Line Access Multiplexer (DSLAM), a Cable Modem Termination System (CMTS), an optical network node, and an edge router.

14. An article of manufacture including a non-transitory computer-readable medium having program instructions stored thereon that, if executed, causes the performance of operations for synchronizing transmission of a stream of packets, the operations comprising:
   receiving a first arrival time information of a first packet in the stream arriving at the first network node;
   receiving a second arrival time information of a second packet in the stream arriving at the second network node;
   based on the first arrival time information and the second arrival time information, calculating delay information; and
   providing at least one of the first network node and the second network node with the delay information, enabling one or more variable delay units in at least one of the first network node or the second network node to delay transmission of the stream to end terminals connected to at least one of the first network node or the second network node.

15. The article of manufacture of claim 14, wherein the first packet contains a reference frame, wherein the stream is associated with a frame rate, and wherein calculating the delay information comprises:
   based on the frame rate and the second arrival time information, determining an arrival time of the reference frame at the second network node, wherein the arrival time of the reference frame at the second network node is earlier than an arrival time of the reference frame at the first network node; and
   determining the delay information to include a first delay, wherein the first delay comprises a difference between the arrival time of the reference frame at the second network node and the arrival time of the reference frame at the first network node.

16. The article of manufacture of claim 15, wherein calculating the delay information further comprises:
   based on the arrival time of the first frame at the second network node being earlier than the arrival time of the first frame at the first network node, determining the delay information to include a second delay, wherein the second delay is zero.

17. The article of manufacture of claim 14, wherein each of the first packet and the second packet contain a respective timestamp or frame number.

18. The article of manufacture of claim 14, wherein the article of manufacture is located in one of a server, the first network node, and the second network node.

19. The article of manufacture of claim 14, wherein the article of manufacture is a synchronization unit, the operations further comprising:
   providing another synchronization unit with the first delay.

* * * * *